United States Patent [19]

Arimilli et al.

[11] Patent Number: 5,109,490
[45] Date of Patent: Apr. 28, 1992

[54] DATA TRANSFER USING BUS ADDRESS LINES

[75] Inventors: Ravi K. Arimilli, Round Rock; Sudhir Dhawan, Austin; James O. Nicholson, Austin; David W. Siegel, Austin, all of Tex.

[73] Assignee: International Business Machines Corporation, Armonk, N.Y.

[21] Appl. No.: 297,772

[22] Filed: Jan. 13, 1989

[51] Int. Cl.⁵ ............................. G06F 1/00
[52] U.S. Cl. ..................... 395/325; 364/DIG. 1; 364/210; 364/210.3; 364/935; 364/935.4
[58] Field of Search ... 364/200 MS File, 900 MS File

[56] References Cited

U.S. PATENT DOCUMENTS

| | | |
|---|---|---|
| 3,656,123 | 4/1972 | Carnevale et al. |
| 3,970,997 | 7/1976 | Daly et al. |
| 4,424,565 | 1/1984 | Larson ............... 364/200 |
| 4,458,308 | 7/1984 | Holtey et al. |
| 4,463,421 | 7/1984 | Laws .................. 364/200 |
| 4,507,732 | 3/1985 | Catiller et al. |
| 4,523,274 | 6/1985 | Fukunaga et al. |
| 4,570,220 | 2/1986 | Tetrick et al. ....... 364/200 |
| 4,626,985 | 12/1986 | Briggs ................. 364/200 |
| 4,631,702 | 12/1986 | Korba |
| 4,665,482 | 5/1987 | Murray, Jr. et al. ..... 364/200 |
| 4,691,342 | 9/1987 | Waldron et al. |
| 4,727,491 | 2/1988 | Culley |
| 4,835,681 | 5/1989 | Culley ................. 364/200 |
| 4,851,990 | 7/1989 | Johnson et al. ......... 364/200 |
| 4,851,991 | 7/1989 | Rubinfeld et al. ....... 364/200 |
| 4,860,193 | 8/1989 | Bentley et al. ......... 364/200 |

OTHER PUBLICATIONS

Technical Disclosure Bulletin, Apr, 1986, vol. 28, No. 11, pp. 4837–4839.

Primary Examiner—Stuart N. Hecker
Assistant Examiner—Rebecca L. Rudolph
Attorney, Agent, or Firm—Kenneth C. Hill

[57] ABSTRACT

A computer system can transfer data between a master subsystem and a slave subsystem on bus address lines as well as bus data lines during a high speed data transfer. Data is clocked during the high speed transfer by a high speed clock signal which is separate from a normal bus clock signal. Data is transferred at the maximum rate which can be handled by both the master subsystem and the slave subsystem.

1 Claim, 7 Drawing Sheets

DATA TRANSFER USING BUS ADDRESS LINES

CROSS REFERENCE TO RELATED APPLICATION

The present application contains subject matter related to co-pending Application Ser. No. 07/297,773, entitled HIGH SPEED DATA TRANSFER ON A COMPUTER SYSTEM BUS, and Application Ser. No. 07/297,774, now abandoned entitled COMPUTER SYSTEM DMA TRANSFER, both filed on Jan. 13, 1989 and assigned to the assignee hereof, and both of which are incorporated by reference herein.

BACKGROUND OF THE INVENTION

1. Technical Field

The present invention relates generally to computer systems, and more specifically to data transfer on a computer bus.

2. Background Art

General purpose computer systems are usually designed to transfer data between various subsystems over a shared data path known as a bus. The various subsystems, such as a central processor, cache controller, and input/output (I/O) subsystems such as keyboard, video, and mass storage controllers may all be attached to a single system bus. The system main memory may also be attached to the system bus. In some systems, main memory is connected directly to the central processor, with the system bus being reserved for I/O data transfer through a DMA device or other I/O controller.

Since a large amount of data is transferred between numerous subsystems on a single bus, the bus itself can often become a performance bottleneck for the overall system. Designing a system bus to be able to handle the heavy load placed upon it is a difficult task. The difficulty of this task is increased in many systems because the precise nature of the equipment to be included in the system may not be known in advance to the bus designer. Different subsystems, made by different manufacturers and having different performance specifications, may all be attached to a single system bus at the same time.

The system bus must be designed to perform correctly regardless of which subsystems are attached to it. In practice, this usually means that a bus is designed to a "lowest common denominator", in which certain aspects of the bus design are chosen to sacrifice performance in order to assure correct operation with all subsystems.

The nature of subsystems to be attached to the system bus can vary. Some subsystems, such as keyboard I/O, usually transfer only a single character or word at one time. Other subsystems, such as video device controllers or DMA controllers attached to mass storage subsystems, usually transfer data in blocks of words. In order to support efficient transfer of block data, many system buses include a block transfer mode, also called a "burst mode" on some systems, which is designed for the express purpose of transferring blocks of consecutive data words. When a block transfer is in effect, some of the standard bus control transactions are not used, which decreases bus overhead and increases the data transfer rate.

Although block transfer modes allow blocks of data to be more efficiently transferred on a bus, the overall system bus performance is limited by the fact that all of the subsystems will be attached to the bus at all times. Thus, bus performance limitations, which are included to allow some low performance subsystems to operate properly, prevent potentially higher performance subsystems from being able to transfer data at a higher rate. In traditional computer system bus designs it is not possible to have different subsystems transfer data over a single bus at different rates. It is also not possible to transfer data using word width greater than those used for normal data transfers.

It would therefore be desirable for a computer system bus to support a high speed data transfer protocol which did not interfere with the proper operation of low performance devices attached to the bus. It would be further desirable for the high speed data transfer protocol on such bus to accommodate subsystems having different, predefined performance limitations, so that certain data transfers between subsystems could be made at a rate limited only by the subsystems involved in the transfer without regard to performance limitations of other devices attached to the bus. It would also be desirable for the bus to increase the data transfer rate by transferring data on every available signal line.

SUMMARY OF THE INVENTION

It is therefore an object of the present invention to provide high speed block data transfer on a computer system bus between a master subsystem and a slave subsystem without such transfer affecting low speed devices attached to the bus.

It is another object of the present invention to provide a high speed block data transfer on a computer system bus between a master subsystem and a slave subsystem wherein the data transfer rate can be varied to accommodate the maximum transfer speeds of the master subsystem and slave subsystem.

It is a further object of the present invention to provide high speed block data transfer on a computer system bus between a master subsystem and a slave subsystem wherein the word width of the data transfer can be made larger than the number of data lines normally available on the bus.

Therefore, according to the present invention, a computer system bus includes a mechanism for a high speed block data transfer between a master subsystem and a slave subsystem. Several bus control signals are dedicated specifically to this function. When a master subsystem and a slave subsystem are both capable of supporting a high speed block data transfer, such fact is communicated on the special control lines. Selected bus control signals are held in a preselected state so that the remaining devices attached to the bus are not affected by the high speed block data transfer. The high speed transfer increases the word width of the transferred data by using the bus address lines to transmit additional data. A starting address for the block is communicated at the beginning of the transfer and the address lines carry data for the remainder of the transfer.

BRIEF DESCRIPTION OF THE DRAWINGS

The novel features believed characteristic of the invention are set forth in the appended claims. The invention itself however, as well as a preferred mode of use, and further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

The preferred embodiment of the invention which will now be described is based upon the microchannel bus which is incorporated in PS/2 microcomputer products available from IBM. Only the control signals necessary for illustrating the present invention are included in this description; additional aspects of the bus upon which this description is based are available in published literature.

Figure 1:
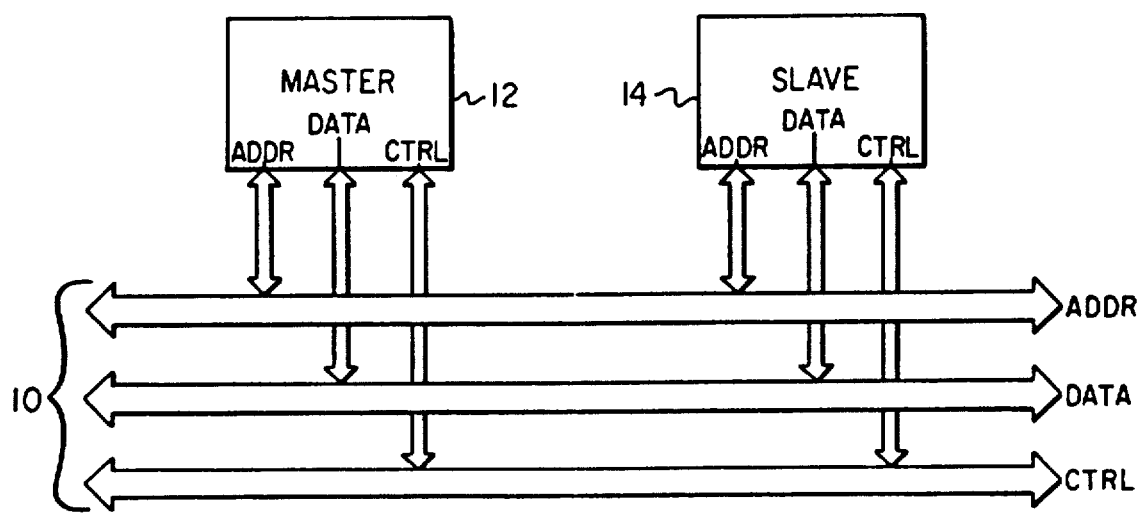
FIG. 1 is a block diagram showing a master subsystem and a slave subsystem connected to a computer system bus.

FIG. 1 shows a computer system bus 10 with two attached subsystems 12, 14. For convenience, the bus signals are broken down into addressing signals ADDR, data signals DATA, and control signals CTRL. The addressing signals ADDR define memory locations within the memory map of the system. For systems such as the PS/2 family which have separate address spaces for system memory and I/O devices, the address signals ADDR also include a signal (not shown) indicating whether the current bus address is a memory address or an I/O address.

In a high speed block data transfer according to the present invention, two devices are involved. One device 12 coupled to the bus will be considered the bus master device, with the other device referred to as the bus slave device 14. Consistent with traditional usage, the bus master 12 is the subsystem which is in charge of the transfer. The slave 14 generates signals and may terminate the transfer, but its control logic is generally simpler than that of the master 12.

In many systems, any given subsystem may be capable of both master and slave operation. In particular, subsystems which are capable of operating as a bus master are also usually capable of operating as a slave. Many simpler devices, such as memory subsystems, are only capable of operating as slaves.

The high speed data transfer which will now be described is referred to herein as a streaming data transfer. This terminology is used to distinguish this new transfer mechanism from previous block mode transfers which operate on different principles.

The discussion of FIGS. 2, 3, 4, and 5 makes the assumption, in all cases, that the bus master can perform the described high speed transfer process. If the master cannot perform the high speed transfer, either by design or because of something in the master's current operational state, data transfer is performed in the normal mode used by the microchannel bus.

Figure 2:
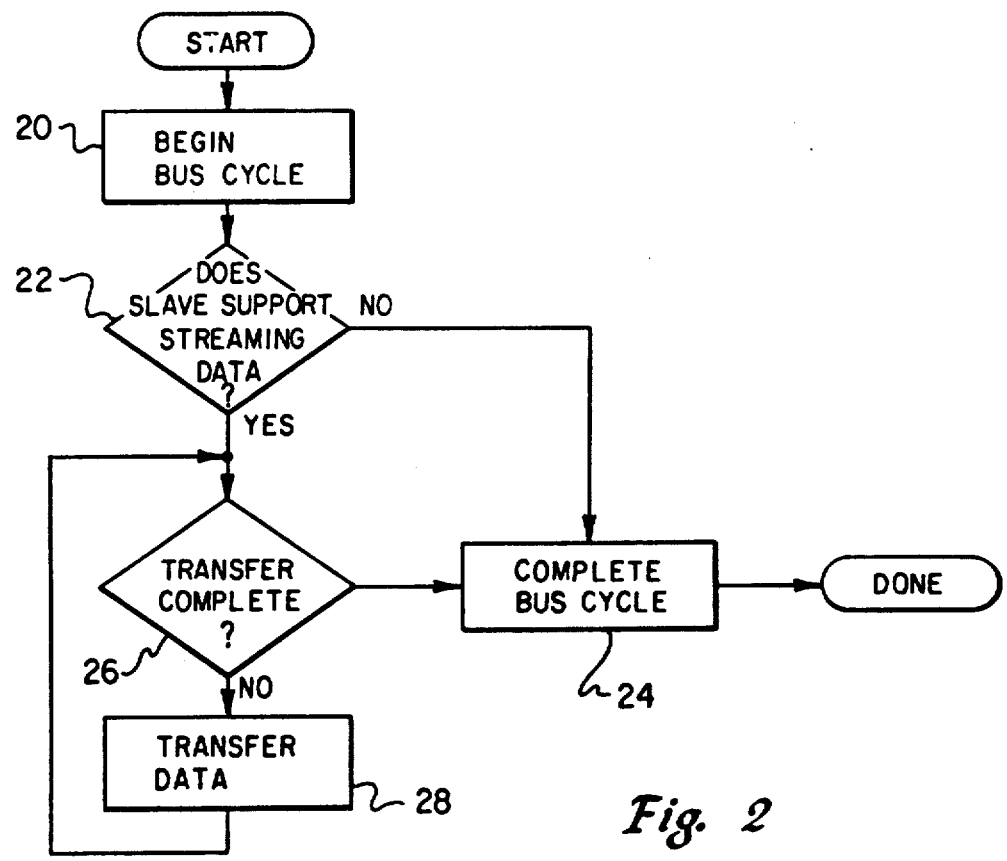
FIG. 2 is a flowchart illustrating operation of a high speed data transfer mode.

FIG. 2 is a high level block diagram illustrating the data transfer process according to the present invention. First, a normal bus data transfer cycle begins 20. At this point, no decision has been made as to whether this cycle will be a normal data transfer or a streaming data transfer. After the cycle begins, the bus master determines whether the slave device supports streaming data transfers 22. If not, a normal bus cycle is completed 24. If the slave does support streaming data, assuming that the master does also, a check is made 26 to see whether the transfer is complete. If it is not, data is transferred 28 and control refers to step 26. During the time that control is looping between steps 26 and 28, the remaining devices attached to the bus can see only that the original bus cycle begun in step 20 has not yet completed. Therefore, they ignore any changing of signals which occurs during the block data transfer.

Once the transfer is complete, as tested in step 26, the normal bus cycle completes 24. At this time, the remaining devices on the bus again operate in normal fashion. It is possible that only a single data transfer will be made at the higher rate, in which case little or nothing is gained. However, the maximum number of data items which may be transferred can be quite large. In many systems, the maximum number will be determined by a bus timeout period. Since a data cycle is begun in step 20, but has not yet completed, a typical bus timeout controller will think that the slave device has not responded at all.

Figure 3A:
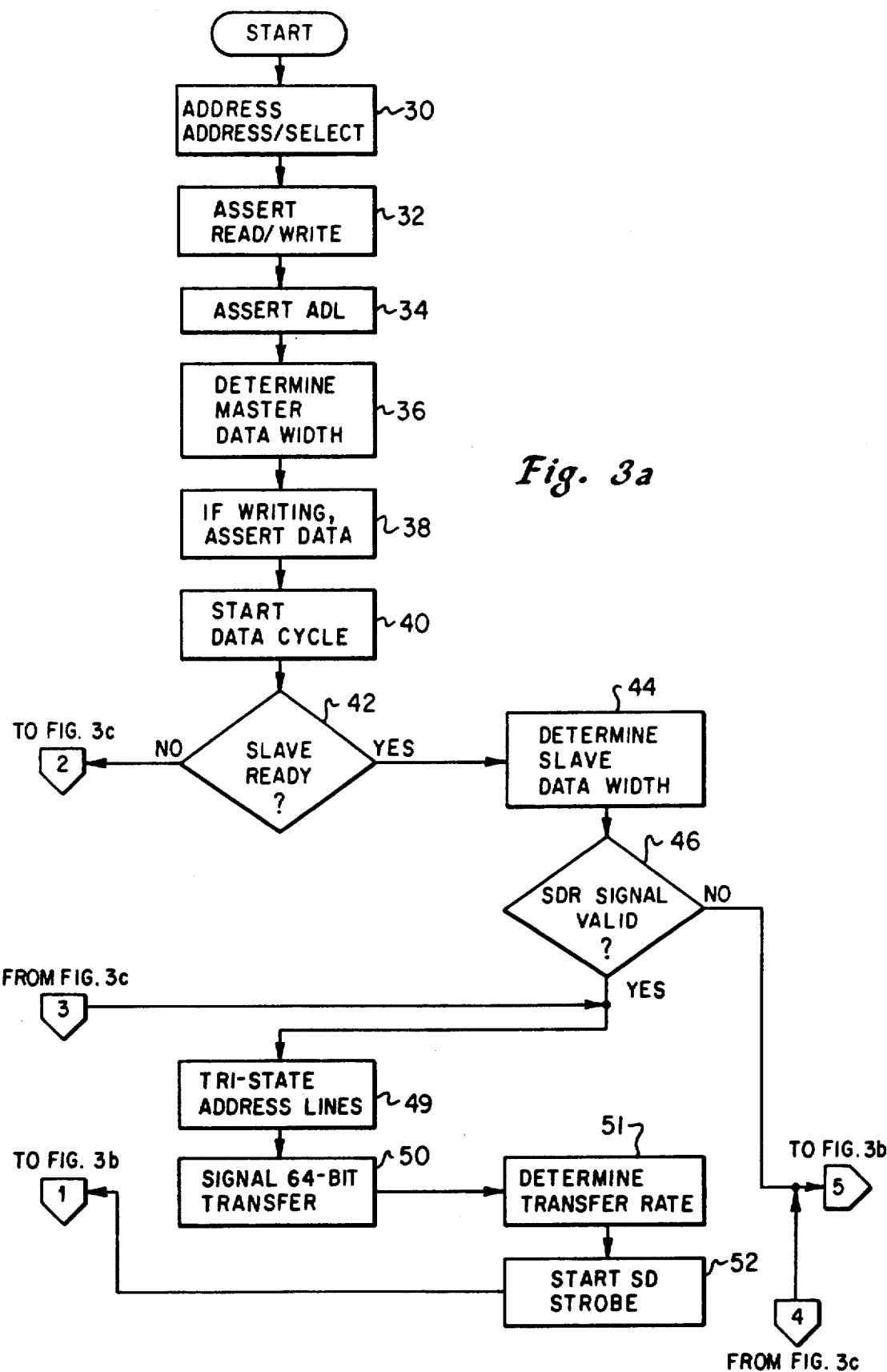
FIG. 3 is a flowchart illustrating the operation of a bus master device.
Figure 3B:
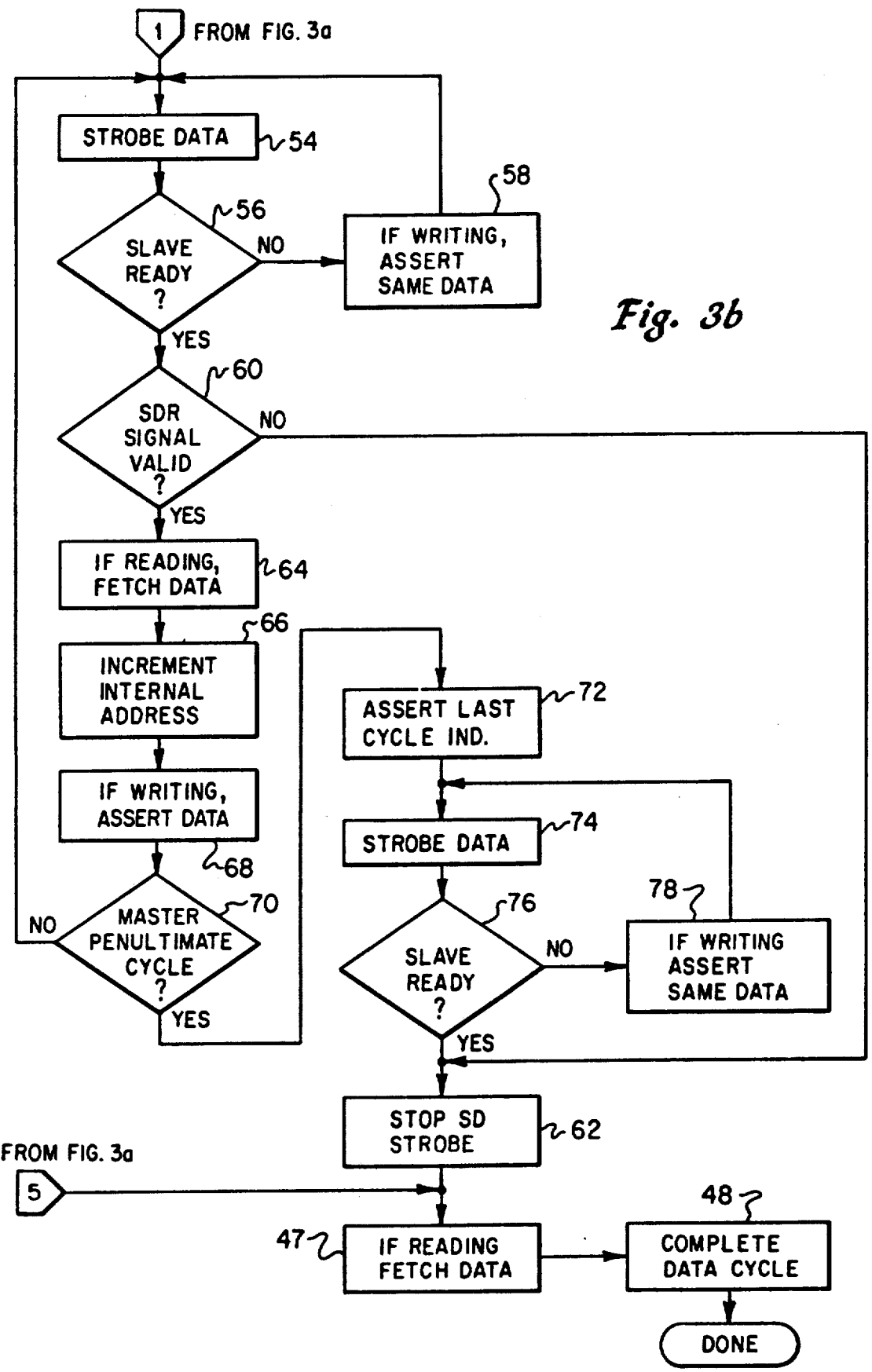
Figure 3C:
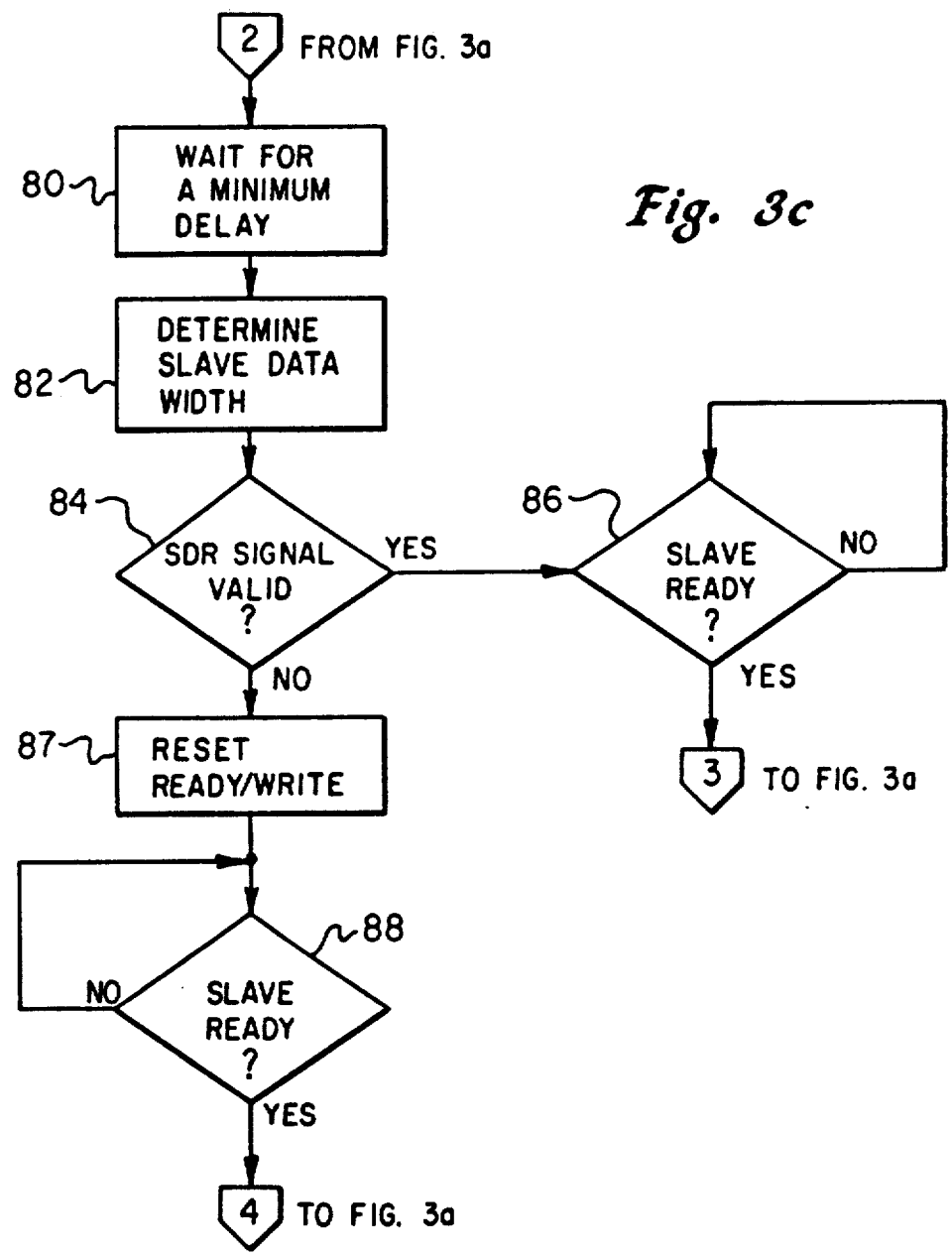
Figure 4A:
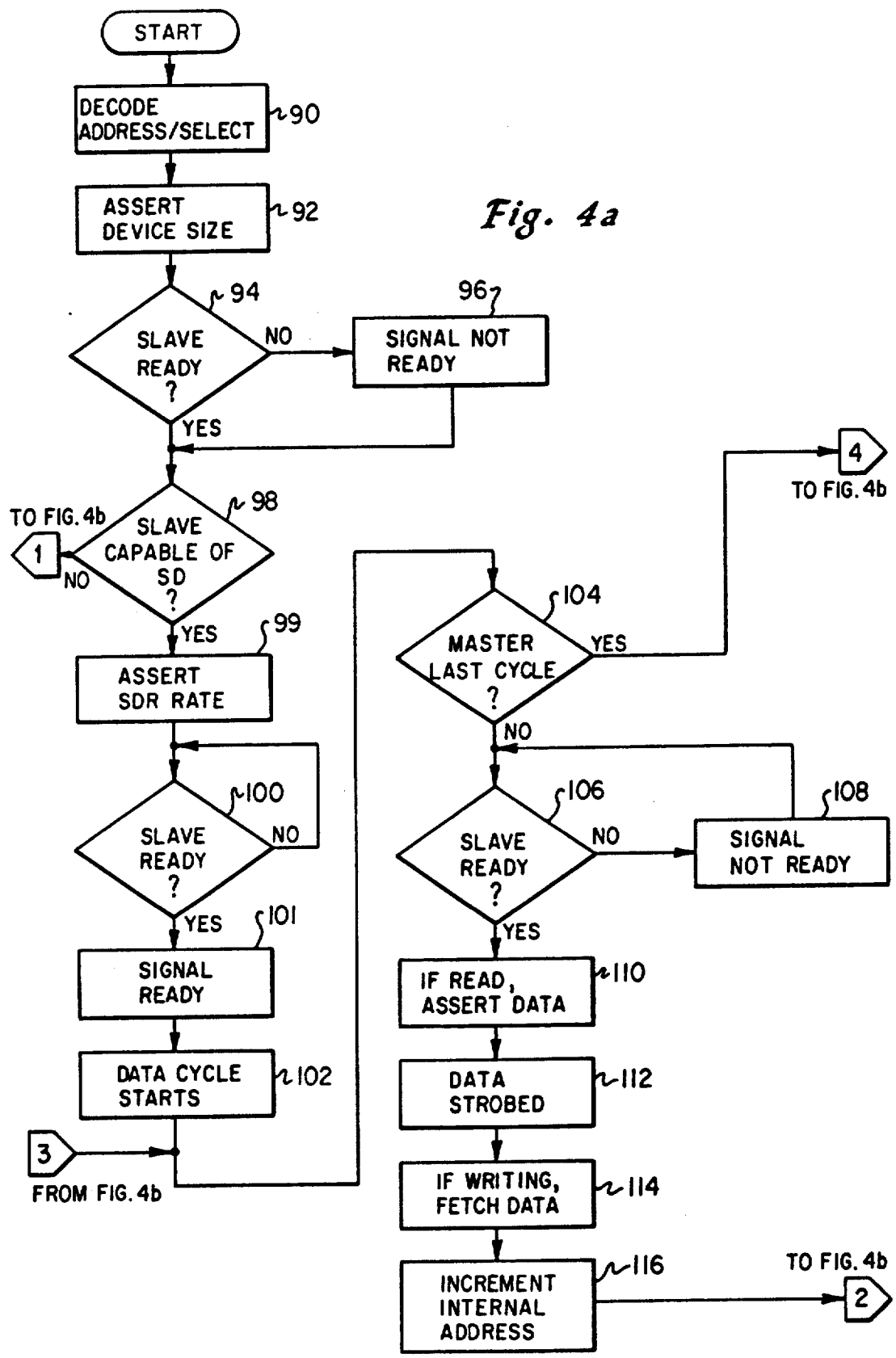
FIG. 4 is a flowchart illustrating operation of a bus slave device.
Figure 4B:
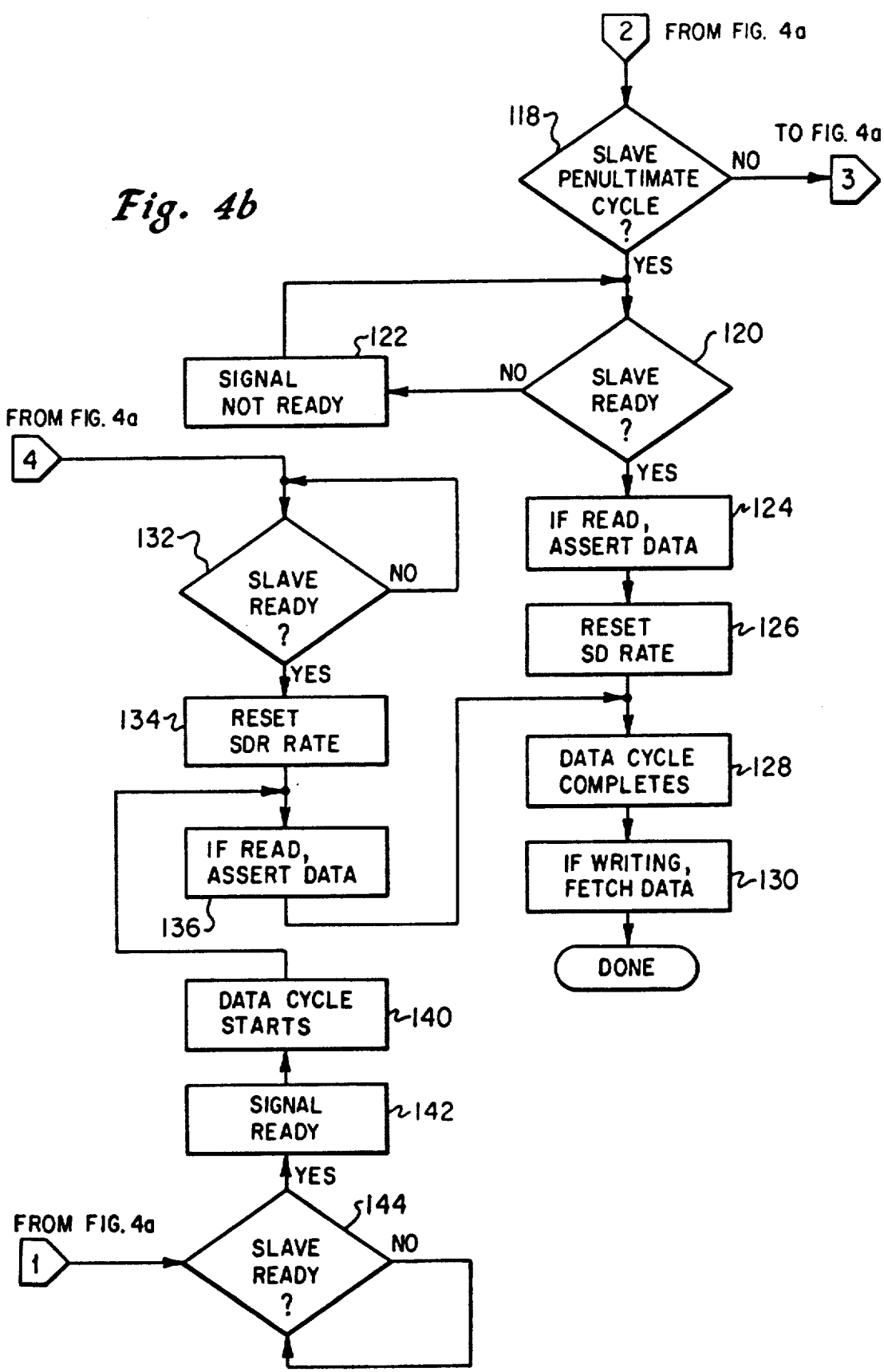

FIG. 3 and 4 are flowcharts illustrating operation of the bus master 12 and slave 14, respectively. Although steps are shown sequentially, some are actually performed in parallel. For example, steps 34 and 38 in FIG. 3 are actually performed simultaneously. Steps 40, 42, 44, and 46 are also performed together. Such implementation details are performed in the same manner as previously done on the microchannel bus.

FIG. 3 is a detailed flowchart illustrating operation of a bus master 12 as used with the preferred embodiment. If the master 12 does not support streaming data transfers, it will simply operate in the normal mode. The flowchart of FIG. 3 illustrates the flow of control within a bus master 12 which does support streaming data transfers.

At the beginning of a bus cycle, the master asserts the address and select signals 30. SELECT is a signal indicating whether the address placed on the bus is a memory address or an I/O port address. Only a single address must be asserted for a streaming data transfer. As will be described, the master 12 and the slave 14 both automatically increment an internal address each time a data item is transferred. This is somewhat analogous to prior art block transfers, in which a starting address and a count of the number of data items to be transferred are the only address related signals required by a DMA device. However, in prior art DMA transfers, the DMA controller typically asserts an address for each data item transferred. In the presently described system, both the master 12 and slave 14 increment addresses internally, so that the address bus is not used for addresses once the streaming data transfer begins. As described below, in the presently described system no block length is defined in advance. Instead, either the master 12 or the slave 14 may terminate the transfer when it is complete.

Shortly after the address is asserted, a READ/-WRITE signal is asserted 32. This indicates whether data will be transferred from the master 12 to the slave 14 (write), or from the slave device 14 to the master 12 (read).

Next, an ADL signal is asserted 34. This signal indicates that the address currently on the address lines of the bus 10 is valid, and typically causes the slave device 14 to write the address into its internal buffers. Bus definitions typically specify a minimum delay period between the time that the addresses become valid and their latching with the ADL signal.

The bus master 12 determines the data width at which it is capable of communicating 36. A master 12 may not be capable of transferring data at the maximum width allowed by the bus 10. For example, on a 32 bit data bus, a given device acting as a bus master for this cycle may only be capable of transferring 8 or 16 bits at a time. In most bus masters, the maximum width of the master does not change, and will actually be determined at some fixed time in the past. However, the results of that determination should be available at step 36.

Figure 5:
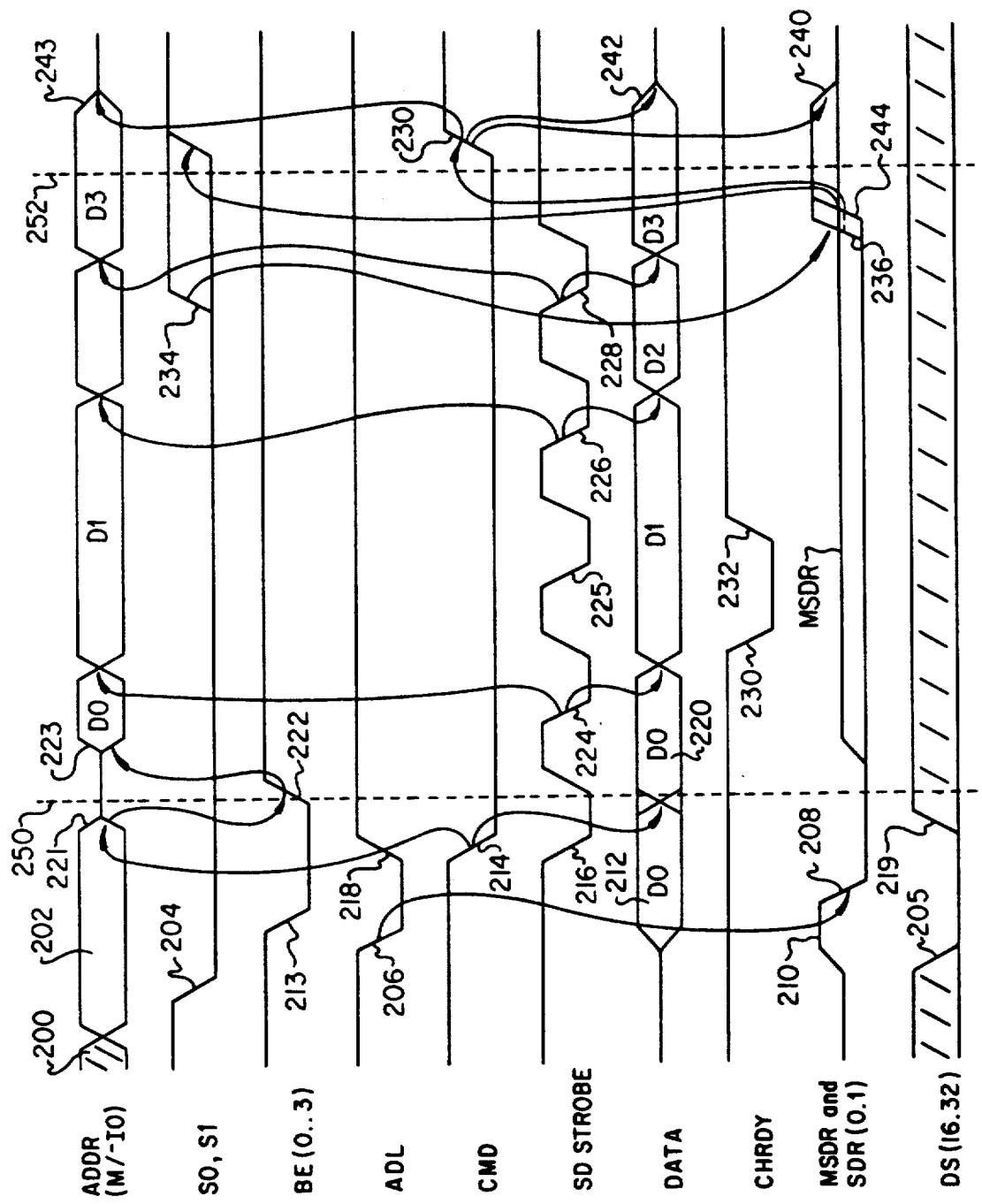
FIG. 5 is a timing diagram illustrating bus signal sequencing for a sample data transfer in high speed mode.

If the current data transfer is a write, thereby transferring data from the master to the slave, the master 12 asserts (places on the data bus) data at this time 38. Such data may be asserted simultaneously with ADL. The master 12 also asserts BE(0 . . . 3) 39, which is a 4 bit signal indicating which bytes of the data bus will be used to transmit data during a normal cycle. This signal has an additional use during certain block transfers as described below. The master then begins the data cycle 40, which consists of transitioning the bus clock. In the preferred embodiment, as illustrated in FIG. 5, the clock signal is transitioned from high to low to start the data cycle.

At the time the data cycle begins, the master 12 detects whether the slave 14 is ready to transfer data 42. This is done by sampling a control line driven by the slave 14 which indicates whether the slave 14 is ready. If the slave 14 is not ready, control passes to step 80. If the slave 14 is ready, the master 12 proceeds to determine the data width which can be handled by the slave 44. Width is sensed on control lines reserved for this purpose, which are driven by the currently addressed slave during each clock cycle. If the master word width is greater than that supported by the slave 14, the master 12 will need to abort or complete this cycle and resend the same data in smaller segments which are acceptable by the slave.

In a preferred embodiment, slave data width is indicated by the signal DS(16.32) combined with MSDR, which gives a 3 bit signal. The possible values of DS(16.32), and their corresponding meanings, are shown in Table I. The master 12 will transfer data at the lesser of the master's word width and the slave's word width.

TABLE I

| MSDR | DS(16.32) | Data Width |
|------|-----------|------------|
| 1 | 00 | 32 bits |
| 1 | 01 | 16 bits |
| 1 | 10 | Reserved |
| 1 | 11 | 8 bits |
| 0 | 00 | 64 bits |
| 0 | 1x | Reserved |
| 0 | x1 | Reserved |

8, 16, and 32 bit transfers are all done on the data lines. 64 bit transfers require that data be transferred on the address bus as well, as is described below.

Up to and including step 44, all of the actions performed by the master 12 are those which are performed in every bus cycle. That is, no special actions have yet been undertaken in support of a streaming data transfer.

In step 46, an SDR signal is tested by the master 12 to see if it is valid. The SDR signal indicates whether the slave device 14 supports streaming data transfers. If it does not, control is transferred to step 47. If the master was reading this cycle it fetches the data from the data bus 47, and completes the data cycle 48. Completing the data cycle 48 is accomplished by transitioning the clock signal from low to high. The READ/WRITE signal should also be transitioned high if it is still low. READ/WRITE may be transitioned high anytime after the SDR signal has been tested. At this point, the master 12 has completed a normal bus cycle.

In step 46, if the slave 14 does support streaming data transfers, control passes to step 49. If the master 12 has only a single data item to transfer, it will typically complete a normal data cycle by forcing control of the transfer to step 46 regardless of the state of the slave's SD signal.

When the streaming data transfer is initiated, the master 12 first tri-states the address lines 49. This is followed by, if this is a 64 bit transfer, signalling that the address lines will be used for data 50. This signalling is preferably done by driving all of the BE(0 . . . 3) lines high. This step is not done unless both the master 12 and slave 14 support 64 bit transfers. If this is a write, the master will put the additional data onto the address lines before the first transfer is made. The master next determines the maximum transfer rate which the slave device supports 51. In a preferred embodiment, this rate is indicated by the same SDR signal which indicates whether the slave supports streaming data transfer.

TABLE II

| SDR(0.1) | Operation & Speed |
|----------|-------------------|
| 00 | SD at 20 MHz (50 ns) |
| 10 | SD at 16 MHz (62.5 ns) |
| 01 | SD at 10 MHz (100 ns) |
| 11 | Basic Transfer Cycle |

In a preferred embodiment, the signal SDR is a 2 bit signal, with the four possible values indicated in Table II. The bit pairs 00, 10, and 01 indicate that the slave 14 can support streaming data transfers at 20 MHz, 16 MHz, and 10 MHz respectively. These clock speeds correspond to cycle times of 50 ns, 62.5 ns, and 100 ns, respectively.

If the SDR signal set by the slave 14 is 11, it does not support streaming data transfer at all, and the master 12 will cause only the basic transfer cycle to be used as described above. This is the value tested for by the master 12 in step 46. If the value of SDR is 11, the SDR signal if considered to be not valid.

Once the transfer rate has been determined 51, the master 12 drives a high speed clock 52, referred to as SD STROBE. This is a free running clock which is a completely separate signal from the normal bus clock. As described above, the normal bus clock is transitioned low in step 40, and transitioned high in step 48 to complete a single bus cycle. The normal system clock remains low during the entire streaming data transfer.

The next step for the master 12 is to strobe the data 54. This means that the master 12 waits for the next cycle of SD STROBE. In a preferred embodiment, the high to low transitions of SD STROBE actually cause the data strobing referred to in step 54.

At the time that the data is strobed, the slave 14 may not yet be ready to transfer data. This is indicated on a signal line reserved for this purpose, and sensed by the master 56 at the time SD STROBE transitions high-to-low. If the slave 14 is not ready, it means that the attempted data transfer must be made again. Therefore, if the master 12 is writing to the slave 14, the same data is asserted on the data lines 58, and control returns to step 54.

Once the slave 14 successfully transfers the data, indicated by the yes branch from step 56, the master 12 tests to see whether the SDR signal driven by the slave 14 is still valid 60. SDR is not valid when SDR(0.1)=11, as shown in Table II. If it is not valid, the slave 14 is terminating the data transfer, and the master 12 transfers control to step 62, which causes the high speed clock (SD STROBE) to stop. The slave 14 is required to indicate its termination of the data transfer before the last data item is transferred. Thus, after the slave 14 terminates the transfer, one last data item is transferred when the normal data cycle completes in step 48.

If the SDR signal remains valid in step 60, control transfers to step 64. If the master 12 is reading data from the slave 14, if fetches the data from the bus 64 and latches it into its internal buffers. The master next increments its internal address 66. After incrementing its address, if the master is writing data to the slave, it asserts the next data item 68.

Next, the master checks to see if this is the penultimate (next to last) cycle 70. If it is not, there are at least two more data items to be transferred, and control returns to step 54.

If this is the next to last cycle, the master asserts the last cycle indicator 72. In the preferred embodiment, indication of the last cycle is done by raising the READ/WRITE signal which is originally asserted in step 32. The data is then strobed 74, and a check is made to see if the slave is ready 76. If not, the same data is asserted if the master is writing to the slave 78, and control returns to step 74. As shown in FIG. 5, this determination of slave 14 readiness is made by waiting for the SDR signals to transition high.

When the slave is ready in step 76, the high speed clock (SD STROBE) is stopped 62, data is fetched if the master is reading from the slave 47, and the data cycle is completed 48. The last item of data to be transferred is always transferred on the normal cycle completion, regardless of whether the streaming data transfer was terminated by the master 12 or the slave 14.

In step 42, if the slave 14 was not ready, control passed to step 80. The master 12 waits for a specified minimum delay 80, then determines the slave's 14 data width 82. During this delay the slave 14 must assert a valid data width signal, even if it is not otherwise ready. This delay allows a bus converter, used to attach a second bus to the bus 10 as known in the art, function properly. The use of this delay was previously included in the microchannel bus design.

At the same time as the slave's 14 data width is determined 82, the SDR signal is again tested for validity 84. SDR must also be asserted during the delay 80, even if the slave 14 is not otherwise ready. If SDR is now valid, the master 12 waits until the slave 14 is ready 86, and control returns to step 50 for a high speed block transfer.

If the slave 14 does not support such transfers, step 84 will result in an invalid SDR signal, and the master 12 resets the READ/WRITE signal 87. When the slave 14 is ready 88 to complete the normal bus transfer, control returns to ste 47.

FIG. 4 illustrates the sequence of steps performed by the slave device 14 during a data transfer. Prior to a new data cycle, the master places the appropriate address on the address lines, and these are decoded by the slave 90.

The slave 14 then asserts the DS(16.32) portion of its device size 92. As shown in Table 1, DS(16.32)=00 for 64-bit transfers.

If the slave 14 is not ready to transfer data at the time the address is latched 94, it signals not ready 96 on a line (CHRDY in FIG. 5) reserved for this purpose. Once the slave is ready, it asserts its device size on DS(16.32). The asserted value is the appropriate value from Table I.

The next action taken by the slave 14 depends on whether or not it is capable of supporting streaming data transfers 98. If the slave is so capable, it asserts the streaming data rate which it can handle 99. This rate is that shown in Table 2. If the slave 14 can handle 64 bit transfers, it asserts the signal MSDR at the same time. MSDR can be returned to the tri-state value anytime after it is sampled when CMD falls, unless the slave 14 was not ready. The data cycle starts 102 when the master 12 drives the bus clock. (step 40 in FIG. 3) A test is made 104 to see if, during the upcoming data cycle, the master 12 is preparing to transfer its last data item. If not, the slave 14 determines whether or not it is ready to receive the next data item 106, and if not signals not ready 108 to the master 12. If the slave 14 is ready, it asserts data onto the bus if this a read cycle 110. If this is a 64 bit read, data is asserted on the address lines as well as the data lines. 64 bit transfers are indicated by the master 12 in step 50 of FIG. 3.

Next, the data is strobed 112, and, if this a write from the master 12 to the slave 14, the slave 14 fetches the data from the bus 114 and loads it into its internal buffers. Again, if this is a 64 bit transfer, data is read from the address lines as well as the data lines. The slave 14 then increments its internal address 116, and determines whether this is the slave's penultimate cycle 118. This is a determination made of the status of the slave device 14; in some transfers, the slave device 14 will determine the size of the streaming data transfer. This situation can occur, for example, in a system in which the slave is a buffered I/O device with a limited buffer size. During a read (slave to master) cycle, the slave will know how much data it has to transmit, and can terminate the transfer when it is done. In a write (master to slave), the slave may need to terminate a transfer in order to prevent buffer overflow.

In any event, if the slave 14 is not prepared to terminate the transfer after the next data item, control returns to step 104. If the slave is preparing to terminate the transfer, it checks to see whether it is ready 120, and signals not ready if it is not 122. When the slave is ready, if the data transfer is a read, it asserts its last data item 124.

The slave 14 resets its SDR rate 126 to 11, which is interpreted by the master 12 as a slave termination of transfer as described in connection with FIG. 3 (step 60). The data cycle then completes 128, and if this was a transfer to the slave 14, it fetches the data from the bus 130 and latches it into its buffers.

If the master 12 terminates the transfer, the yes branch will be taken from step 104, transferring control to step 132. As described in connection with FIG. 3, the master termination event is indicated by raising the READ/WRITE signal to a high value. If the slave 14 is not ready 132 it simply waits. When it is ready, the slave resets the SDR rate 134 to 11. If this is read transfer, the slave places its data on the bus 136, and waits for the data cycle to complete 128. As in the usual case, if this is a write transfer, data is fetched from the bus 130 after the cycle completes.

If the slave 14 is not ready in step 132, it is not necessary to signal this fact as is done in steps 94 and 122. When the master 12 terminates, the slave 14 signals that it is ready by resetting the SDR rate (step 134). This hand shaking protocol prevents the master 12 from completing the cycle until the slave 12 is ready to transfer the last data item If the slave 12 does not support streaming data transfers, control branches to step 138 from step 98. The slave 14 waits until it is ready 138, then signals such fact. The data cycle starts 140, and the slave 12 asserts data 136 if this is a read cycle. The data cycle then completes 128 as described above.

FIG. 5 is a timing diagram illustrating most of the operations described in connection with FIGS. 3 and 4 with a sample transfer. The transfer described is a four word streaming data transfer. Several options, such as read and write transfers, and master and slave terminated transfers, are illustrated.

The address signals of the bus 10 are shown by ADDR. For the timing diagram of FIG. 5, ADDR includes the memory/I/O select line (M/-IO). ADDR is 32 bits wide, not including M/-IO. The signals S0 and S1 are control lines driven by the master 14 to indicate whether this is a read or write transfer. If S0 is low, the transfer is a read. If S1 is low, it is a write transfer. S0 and S1 may not both be low at the same time.

The signal BE(0 . . . 3) is used to indicate which bytes of the 32 bit data bus are transmitting the data. It is also used by the master 12 to indicate that a 64 bit transfer is occurring. The signal ADL is the signal used to latch the address, and the CMD is the normal bus clock. SD STROBE is the streaming data, high speed clock. The signals ADDR, S0, S1, BE(0 . . . 3), ADL, CMD, and SD STROBE are all driven by the bus master 12.

The signal DATA contains 8, 16, or 32 bits of data, whichever is supported by both the master 12 and slave 14. The DATA lines are driven by the master 12 during a write transfer, and by the slave 14 during a read transfer.

The signal CHRDY is used by the slave 14 to indicate whether or not it is ready to transfer data as described in connection with FIG. 4. The 2 bit signal SDR(0.1) indicates whether or not the slave 14 supports streaming data transfers, and the speed if they are supported, as defined in Table II. MSDR indicates whether the slave 14 supports 64-bit transfers. The 2 bit signal DS(16.32), when combined with MSDR as defined in Table I, indicates the slave word width. The signals CHRDY, SDR(0.1), MSDR, and DS(16.32) are all driven by the slave 12.

Initially, the address lines are not guaranteed to contain valid values 200. To initiate a transfer, the master 12 drives valid address signals 202 onto the lines ADDR. Next, the appropriate read or write signals S0, S1 are driven low 204. The slave 14 drives its data width onto DS(16.32) when it recognizes that it has been addressed 205. After the ADDR signals have been valid for at least a defined minimum time, ADL transitions low 206 to latch the address into the slave's buffers. When the slave 12 detects the transition of ADL, it drives the SDR signals 208 to the appropriate value showing the transfer rate it supports. The SDR signals are typically driven to a high value 210 from a tri-state condition when the slave device 14 detects that it is being addressed. The tri-state to high transition is not controlled by the transition of ADL, as was the case with the DS signals. The SDR and MSDR signals must be asserted prior to the first rising transition 209 of SD STROBE, at which time the master 12 samples SDR and MSDR.

If this is a write transfer, the master 12 next places information in DATA 212, which was previously tri-stated. The signal BE(0 . . . 3) is driven 213 to the appropriate values to indicate which bytes of DATA will be used for this transfer. The master 12 then begins the data cycle by transitioning CMD low 214. Preferably, SD STROBE is transitioned low 216 at the same time, and ADL is transitioned high 217. Steps 40, 44, 46, 50, and 52 shown in FIG. 3 are thus occurring simultaneously, in that the master 12 is starting the SD STROBE, and determining the data width and transfer rate of the slave simultaneously, at the time CMD transitions low 214.

After CMD transitions low 214, the slave 14 can allow DS(16.32) to become undefined 219. If this is a read (slave to master) transfer, the slave drives the first data item (D0) onto the data lines 220 in response to the high-to-low transition 214 of CMD.

64 bit transfers must be supported by both the master 12 and the slave 14. If this is a 64 bit transfer, the master 12 tri-states the address lines after CMD goes low 214. This is followed by driving all of BE(0 . . . 3) high 222 to indicate to the slave 14 that a 64 bit transfer will occur. In response to the BE(0 . . . 3) transition 222, data is placed on the address lines 223. The master 12 puts this data on ADDR if the transfer is a write, and the slave 14 does so if it is a read. The handshaking of the transitions ADDR to BE(0 . . . 3) and BE(0 . . . 3) to ADDR prevents collisions between address and data signals on ADDR.

The SD STROBE signal is now free running. The "strobe data" steps of FIGS. 3 and 4 occur on the high-to-low transitions 224, 225, 226, and 228 of SD STROBE. After each such transition, the device which is driving data onto the bus places the next data item on DATA, and ADDR for 64 bit transfers. For so long as the slave can keep up with the transfer, a new item will be placed in DATA and ADDR for each cycle of SD STROBE.

In the example of FIG. 5, the slave determines during the second high-to-low transition 224 of SD STROBE that it will be unable to transfer data item D1 at the next cycle. This is the determination made in step 106 of FIG. 4. Since the slave 14 is not ready to transfer the next data item, it drives the signal CHRDY low 230. When the signal SD STROBE next makes a high-to-low transition 225, the master 12 detects that the slave 14 has indicated that it is not ready. This detection is made in step 56 of FIG. 3.

The signal SD STROBE continues running, even though no data is being transferred. If this is a write cycle, the master 12 continues placing the same data onto the bus. If it is a read cycle, the master ignores whatever data happens to be on the bus, as it is assumed to be invalid. FIG. 5 shows CHRDY being held low by the slave 14 for only a single clock cycle, but it may be held low longer if necessary. When the slave 14 is ready to transfer the next data item, control in FIG. 4 passes to step 110, and CHRDY is allowed to go high 232. At the next high-to-low transition 226 of SD STROBE, the master 12 detects that the data has properly transferred, and continues its normal function.

A master terminated transfer is indicated when the master 12 drives the appropriate signal, S0 or S1, high 234. This is preferably done simultaneously with a highto-low transition of SD STROBE 238. This transition 234 is detected in step 104 of FIG. 4, and the slave 14, when ready, drives the signals SDR(0.1) high 236. This is shown in step 134 of FIG. 4. Once the slave 12 has indicated ready 236, the master 14 drives CMD high 238 to complete the data cycle. This is shown in step 48 of FIG. 3 and step 128 of FIG. 4. The last data item, D3 in FIG. 5, is transferred on the positive-going transition 238 of CMD.

After the slave 14 detects the low-to-high transition 238 of CMD, it tri-states SDR(0.1) 240, DATA 242, and ADDR 243 if this was a read transfer, in order to prevent bus collisions with other devices.

If the slave 14 terminates the transfer, it indicates such fact by a low-to-high transition 244 of SDR(0.1). The master 12 senses this transition asynchronously, so that the timing of the transition 244 need not be synchronized with SD STROBE. The master 12 senses this transition in step 60 of FIG. 3. In response to the end of transfer indication 244 from the slave 14, the master 12 drives S0 or S1 high 246, and also drives CMD high 238. As before, the final data item D3 is transferred on the low-to-high transition 238 of CMD. Also, DATA, ADDR, and SDR(0.1) are tri-stated after CMD goes high.

The remaining devices on the bus are completely unaffected by the transfer of FIG. 5 because CMD has remained low throughout the entire transfer. When ADL transitioned low 206, the remaining devices, which were not addressed, became idle. They are awakened from their idle state only when CMD transitions from low to high 238. To the remaining devices, the streaming data transfer appears simply as a stretched-out normal transfer.

The events which occur during a normal transfer are those which occur to the left of the first dashed line 250, and to the right of the second dashed line 252. In a normal transfer, CMD goes low 214, D0 is placed on the data bus by the master 12 or by the slave 14, and that same D0 is transferred when CMD transitions low-to-high 238. As described above, the remaining devices on the bus are unaffected by an events occurring between the dashed lines.

The details of the bus interfaces needed to implement the master and slave as described above are well within the skill of a person skilled in the art. The interfaces can utilize random logic, or programmable logic arrays or other programmable devices to reduce parts count.

As will be appreciated by those skilled in the art, the streaming data transfer described above allows a very high transfer rate for block data. It allows both high performance and low performance devices to operate normally on the same bus. Those devices for which a high speed block transfer is suitable, such as mass storage controllers and video controllers, can take advantage of streaming data transfer, while other devices can be built for less cost. Since data is transferred on the address lines as well as the data lines, the effective transfer rate is doubled without requiring any higher performance from any of the subsystem involved.

While the invention has been particularly shown and described with reference to a preferred embodiment, it will be understood by those skilled in the art that various changes in form and detail may be made therein without departing from the spirit and scope of the invention.

What is claimed is:

1. A system for transferring data in a digital computer, comprising:

a bus having address lines, data lines, and control liens;

a master subsystem connected to said bus;

a slave subsystem connected to said bus;

a control line in said bus for communicating a transfer mode signal, wherein data is transferred between said master subsystem and said slave subsystem on the data lines when the transfer mode signal indicates a first mode, and wherein data is transferred between said master subsystem and said slave subsystem on the data lines and on at least one of the address lines when the transfer mode signal indicates a second mode;

a clock line in said bus for communicating a clock signal;

a high speed line in said bus for communicating a high speed clock signal, wherein data is transferred under the control of the high speed clock signal when the transfer mode signal indicates the second mode;

a transfer rate line in said bus for communicating a transfer rate signal, wherein the high speed clock signal operates at a rate determined by the transfer rate signal when the transfer mode signal indicates the second transfer mode; and a ready line in said bus for communicating a ready signal under control of said slave subsystem, wherein data is transferred under the control of the high speed clock when the ready signal indicates that said slave subsystem is ready to transfer data, and wherein data transfer is suspended when the ready signal indicates that said slave subsystem is not ready to transfer data.

* * * * *

UNITED STATES PATENT AND TRADEMARK OFFICE
CERTIFICATE OF CORRECTION

PATENT NO. : 5,109,490
DATED     : April 28, 1992
INVENTOR(S) : Ravi K. Arimilli, et al.

It is certified that error appears in the above-identified patent and that said Letters Patent is hereby corrected as shown below:

Column 12, line 19 "liens" should be --lines--.

Signed and Sealed this

Twenty-fourth Day of August, 1993

Attest:

BRUCE LEHMAN

Attesting Officer      Commissioner of Patents and Trademarks